United States Patent [19]

Beck

[11] Patent Number: 5,301,776
[45] Date of Patent: Apr. 12, 1994

[54] HYDRAULIC ADJUSTABLE VIBRATION DAMPER

[75] Inventor: Hubert Beck, Eitorf, Fed. Rep. of Germany

[73] Assignee: Boge AG, Eitorf, Fed. Rep. of Germany

[21] Appl. No.: 971,339

[22] Filed: Nov. 4, 1992

[30] Foreign Application Priority Data

Nov. 16, 1991 [DE] Fed. Rep. of Germany ....... 4137821

[51] Int. Cl.$^5$ .................... B60G 17/08; F16F 9/50
[52] U.S. Cl. .................... 188/322.13; 188/299; 188/315
[58] Field of Search ............ 188/299, 298, 311-319, 188/322.13; 280/707, 714

[56] References Cited

U.S. PATENT DOCUMENTS

| | | | |
|---|---|---|---|
| 4,614,255 | 9/1986 | Morita et al. | 188/298 |
| 4,762,308 | 8/1988 | Geno | 188/298 |
| 4,802,561 | 2/1989 | Knecht et al. | 188/299 |
| 4,850,460 | 7/1989 | Knecht et al. | 188/299 |
| 4,880,086 | 11/1989 | Knecht et al. | 188/298 |
| 4,958,704 | 9/1990 | Leiber et al. | 188/299 |
| 5,005,677 | 4/1991 | Bucholtz et al. | 188/299 |
| 5,163,706 | 11/1992 | Maguran, Jr. et al. | 280/707 |

FOREIGN PATENT DOCUMENTS

3712477 10/1987 Fed. Rep. of Germany.
3719113 8/1988 Fed. Rep. of Germany.

*Primary Examiner*—Robert J. Oberleitner
*Assistant Examiner*—Chris Schwartz
*Attorney, Agent, or Firm*—Nils H. Ljungman

[57] ABSTRACT

Hydraulic adjustable vibration damper with a piston fastened to a piston rod and dividing a work cylinder into two work chambers filled with damping fluid, whereby at least partly to control the damping force, an electromagnetically activated damping valve comprising a coil, a magnetic armature, a valve body and a valve seat pressurizes a flow passage. The connection between the armature and the valve body is designed so that it can be adjusted axially, to set the length of the valve stroke after assembly.

15 Claims, 5 Drawing Sheets

HYDRAULIC ADJUSTABLE VIBRATION DAMPER

BACKGROUND OF THE INVENTION

1. Field of the Invention

This invention relates to a hydraulic adjustable vibration damper with a piston fastened to a piston rod and dividing a work cylinder into two work chambers filled with damping fluid, whereby at least partly to control the damping force, an electromagnetically activated damping valve consisting of a coil, a magnetic armature, a valve body and a valve seat pressurizes a flow passage.

2. Background Information

There may be known hydraulic adjustable vibration dampers (e.g. U.S. Pat. No. 4,850,460, entitled Hydraulic Adjustable Shock Absorber, which corresponds to Federal Republic of Germany Patent No. 37 12 477; and U.S. Pat. No. 4,880,086, entitled Adjustable Vibration Damper, which corresponds to Federal Republic of Germany Patent No. 37 19 113), the damping force of which can be adjusted. For this purpose, a damping valve equipped with an axially movable valve body and a valve seat controls the effective cross section of a damping passage. The electromagnetically activated damping valve comprises a number of individual parts, e.g. magnetic armatures, valve bodies and the armature guide surrounding the magnetic armature, where the individual parts have the normal manufacturing tolerances. For functional reasons, the armature of the electromagnet must coincide very precisely on its end surface with the barrel of the armature guide, and at the same time the valve cone or face must assume the sealed position. If manufacturing tolerances exist in the axial direction, the valve strokes will be different.

To prevent such tolerances or spreads, one of the inside parts can be manufactured with a certain amount of oversize and can be machined to the proper size after measurement. Such spreads can also be eliminated by installing prefabricated spacer discs, but for that method there must be a correspondingly graduated assortment of spacer discs available. The two methods described above, however, are unsuitable for the mass production of such electromagnetically activated damping valves.

OBJECT OF THE INVENTION

The object of the invention, on a vibration damper with an electromagnetically activated damping valve, is to design the armature and the valve body so that the length of the valve stroke can be adjusted after the vibration damper has been assembled.

SUMMARY OF THE INVENTION

This object is achieved by the valve body having an adjusting device.

According to one essential feature of the invention, the connection between the armature and the valve body is designed so that it is axially adjustable.

One advantage of this solution is that on account of the axially adjustable connection, compensation for manufacturing tolerances becomes possible, by a method which can be easily used under mass production conditions and which requires a minimum of added effort and expense during assembly. The adjustable connection makes possible a precise adjustment of the relative position of the inner parts, and both positive and negative tolerances can be compensated for with equal ease.

In accordance with an additional essential feature of the invention, the connection is an adjusting screw. The adjusting screw can be advantageously located inside the armature, so that the valve body can be supported on the adjusting screw.

In an additional embodiment, the valve body is provided on the side facing the armature with a threaded part, which is engaged in a corresponding area of the armature.

So that a precise adjustment of the relative position of the valve parts can be made after assembly, in accordance with an essential feature of the invention, the connection is accessible and can be adjusted from the outside via holes. An advantage of this configuration is that after the setting has been made, the holes can be easily closed with vent plugs, drain plugs or similar devices.

In an additional configuration of the invention, inside the armature there is a spring which can be prestressed by means of an axially adjustable stop plate. The stop plate is also advantageously accessible from outside.

In an additional configuration of the invention, the connection between the armature and valve body is accessible from outside through the stop plate. Not only can the relative position of the internal parts of the valve be adjusted from outside, but at the same time the prestress of the valve body can also be set from outside by means of the spring and the corresponding stop plate, so that the adjustment can be performed after the complete assembly of the damping valve on the vibration damper. In an additional favorable embodiment, the adjustment device is formed by an axially adjustable hollow-core screw, the end surface of which forms the valve seat.

One aspect of the invention resides broadly in a vibration damper for motor vehicles, the damper comprising a cylinder assembly having an arrangement for varying damping of a piston assembly disposed therein, the piston assembly dividing the cylinder into at least two chambers, each for containing damping fluid, the vibration damper comprising: a device for throttling the damping fluid when the damping fluid moves from one of the chambers into another; the piston assembly having a piston rod and piston; the piston rod having a first device for attachment of the piston rod at one end thereof; the cylinder assembly having a second device for attachment at a portion thereon other than the first device for attachment at the piston rod; a device for bypassing damping fluid between the at least two chambers; a device for accepting bypassed damping fluid; the bypassing device being disposed to bypass the damping fluid from at least one of the damping fluid-containing chambers to the accepting device; the bypassing device including a valve device for regulating flow of the damping fluid in the bypassing device; and the valve device comprising: a valve seat and a displaceable component for opening and closing against the valve seat and for regulating flow of the damping fluid in the bypassing device; the displaceable component being displaceable between a closed position and an open position, the displaceable component being disposed against the valve seat in the closed position, the displaceable component being disposed away from the valve seat in the open position, and the displaceable component being configured for being displaceable a first distance between the closed position and the open position; and a device for adjusting the first distance between the closed position and the open position.

BRIEF DESCRIPTION OF THE DRAWINGS

Preferred embodiments of the invention are schematically illustrated in the accompanying drawings.

DESCRIPTION OF THE PREFERRED EMBODIMENTS

Figure 1:
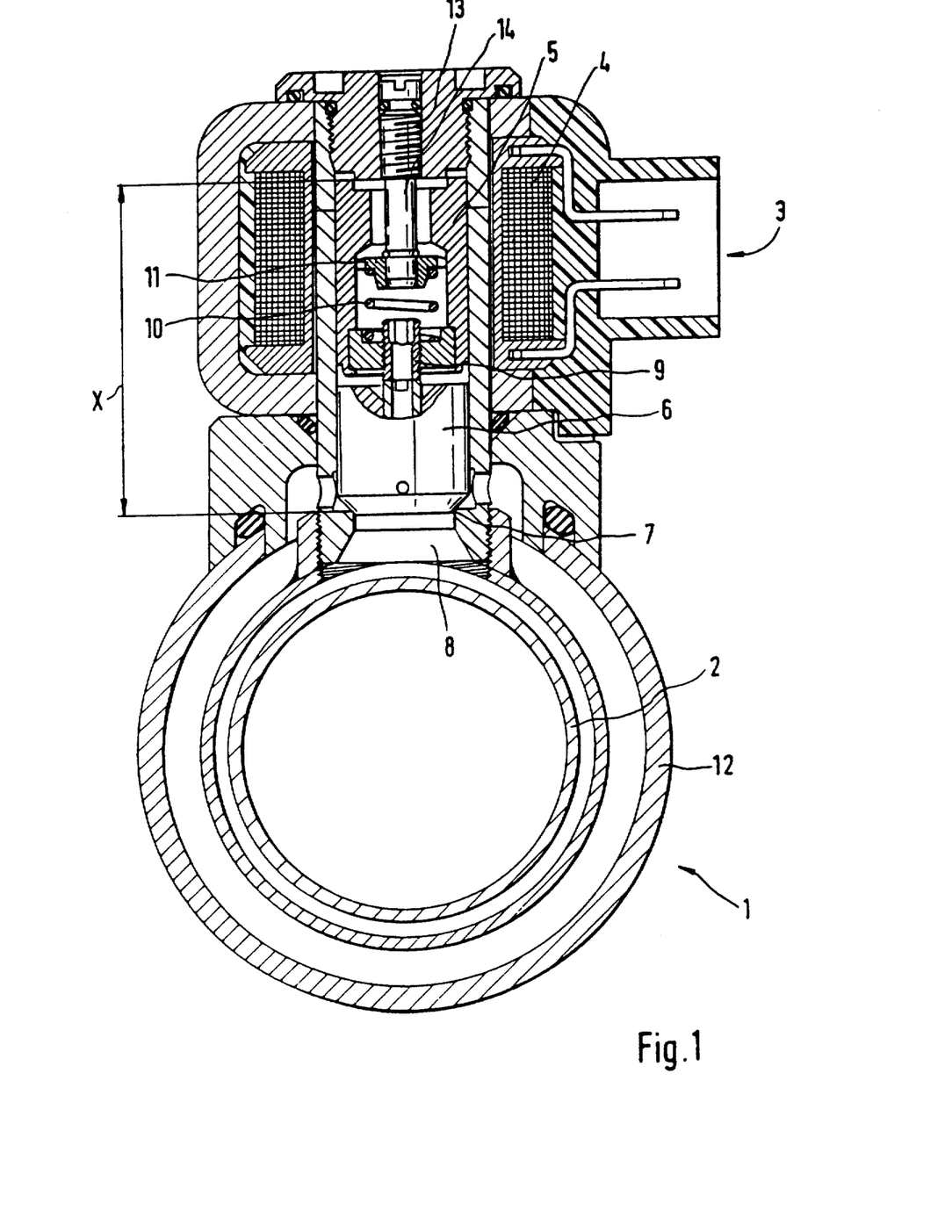
FIG. 1 shows a vibration damper together with an electromagnetically activated damping valve, in cross section.

The embodiment illustrated in FIG. 1 shows a vibration damper 1 in cross section, wherein for purposes of simplification, the work piston and the piston rod are not shown. The work cylinder 2 is surrounded by a jacket tube 12, on the outer circumferential surface of which there is an electrically controllable damping valve 3. The electrically controllable damping valve 3 comprises in particular the coil 4, the armature 5 and the valve body 6. The valve body 6 forms a valve seat 7, so that the flow passage 8 can be opened or closed.

The armature 5 is equipped with an adjusting screw 9, so that by means of an appropriate adjustment of the valve body 6, contact takes place. By means of an appropriate setting of the adjusting screw 9, an appropriate distance X can be set from the valve seat 7 to the upper end surface of the armature 5, so that the valve stroke can be correctly adjusted. Before the plugs 13 are installed, suitable tools can be used through the hole in the plugs 13 to adjust the hexagonal socket of the adjusting screw 9, so that the relative distance X can be set.

By means of the spring 10 and the stop plate 11, the prestress of the valve body 6 can be set by installing the plugs 13 at an appropriate distance on the pin 14.

This embodiment relates to a piloted damping valve, wherein the individual part which are necessary for the pilot control are located inside the inner chamber of the valve body 6.

Figure 2:
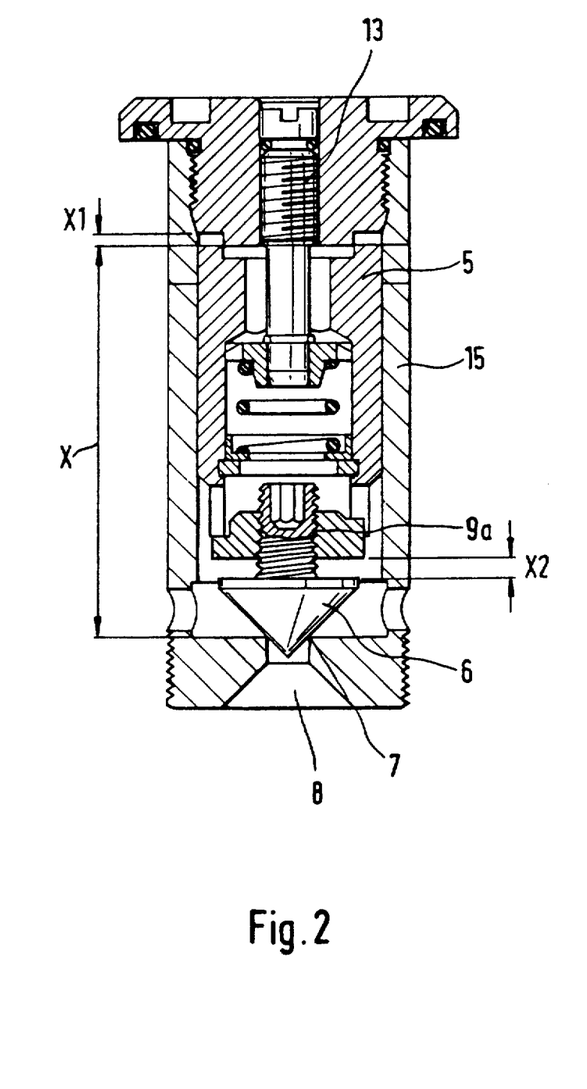
FIG. 2 shows an additional embodiment of an armature guide together with a magnetic armature and a valve body, as a detail in cross section.

FIG. 2 shows, in detail, an armature guide 15 of an electrically activated damping valve, wherein in the cylindrical internal chamber of the armature guide 15, the armature 5 and the valve body 6 are connected to one another by means of the screw fitting 9a. In this embodiment, too, a corresponding adjustment can be made by means of the hexagonal socket of the screw connection 9a through the hole in the plugs 13. This embodiment relates to a directly-controlled damping valve, in which the flow passage 8 can also be regulated either continuously or in stages. As a result of the relative adjustment of the armature 5 in relation to the valve body 6 by means of the adjusting screw 9a, the relative distance X can be correctly set under mass production conditions in this embodiment also.

Figure 3:
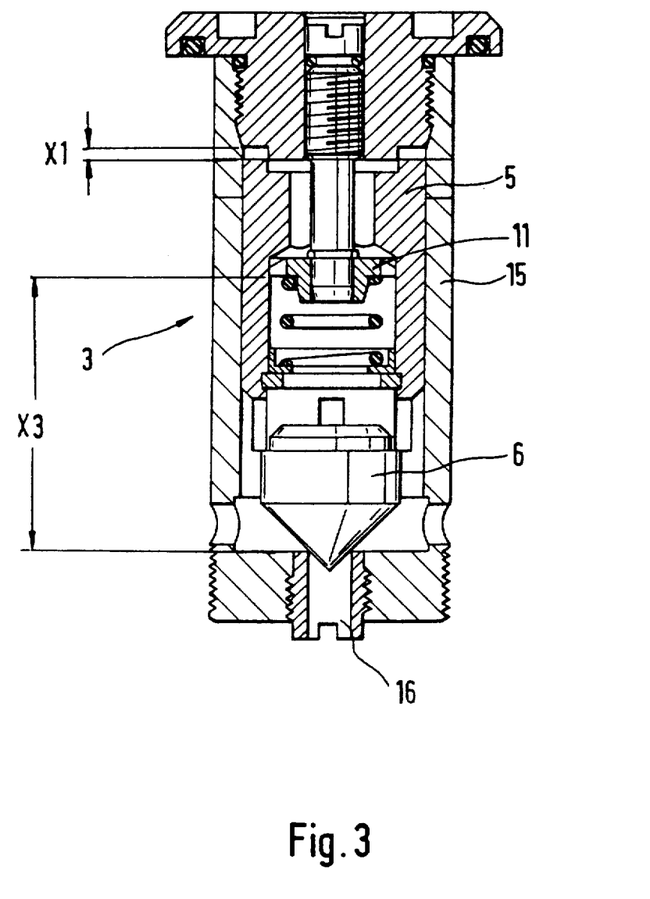
FIG. 3 shows an additional embodiment of the adjusting device.

FIG. 3 relates to an armature guide 15, in which in the lower region, the adjusting device is designed as a hollow-core screw 16 and can be axially adjusted in relation to the armature 5 and/or the valve body 6. At the same time, the hollow-core screw 16 is used as a valve seat for the damping valve 3.

Figure 4:
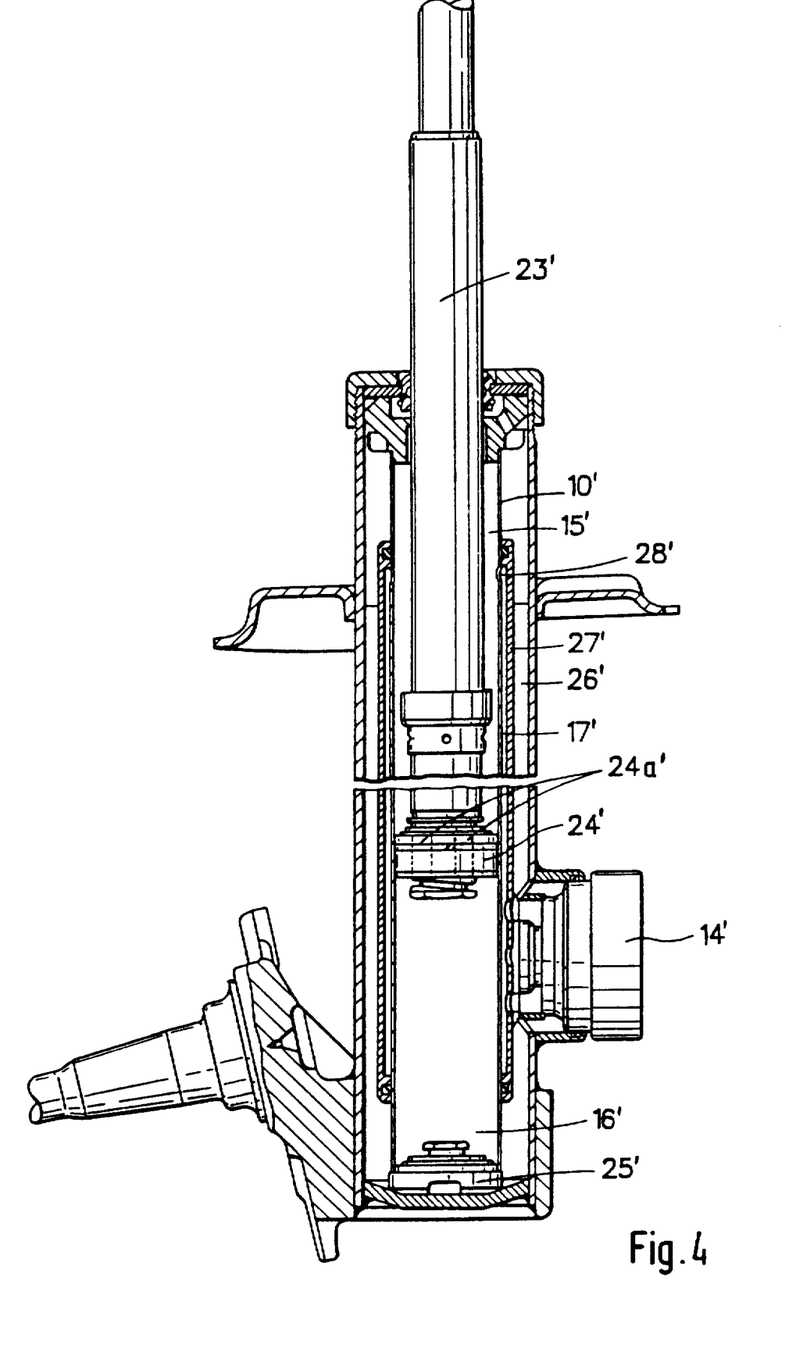
FIG. 4 shows a vibration damper together with an external damping valve.

FIG. 4 is a schematic illustration of a two-tube vibration damper, which comprises the work cylinder 10', a piston rod 23' and a piston 24' fastened to the piston rod 23'. The piston 24' divides the work cylinder 10' into the upper work chamber 15' and the lower work chamber 16'. The piston 24' is equipped with passages and throttle valves 24a'. In the base of the work cylinder 10', there is a base valve 25', by means of which the damping medium can get into the equalization chamber 26'. In the equalization chamber 26', there is a tube 27', which forms a bypass 17' via the holes 28'. In this bypass 17', there is a damping valve 14'. The bypass 17' works parallel to the throttle valves of the damping piston 24' and to the base valve 25'.

Figure 1A:
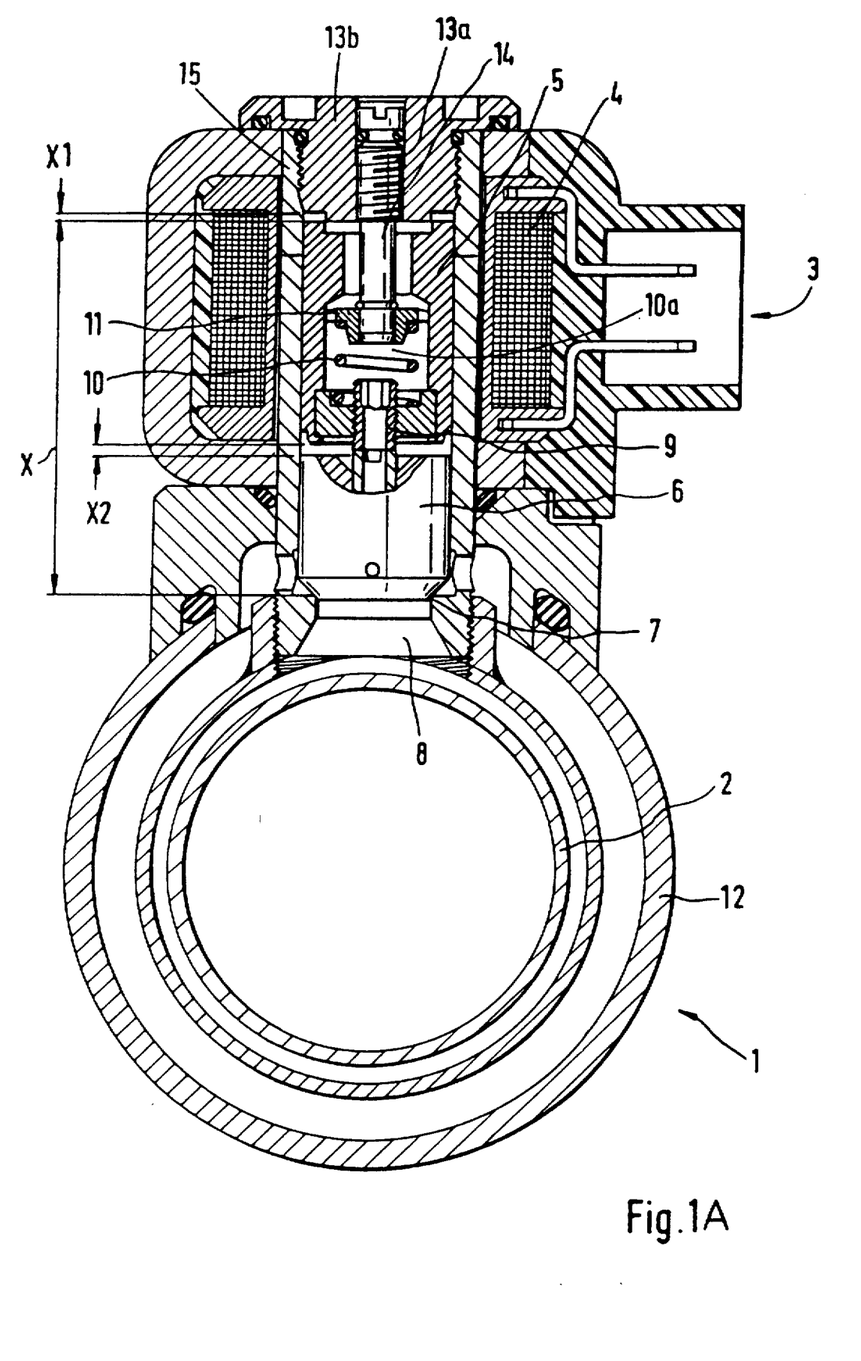
FIG. 1A shows the same vibration damper as does FIG. 1, with additional reference numerals.

In other words, FIG. 1A illustrates the same embodiment as does FIG. 1. FIG. 1A has additional reference numerals. FIG. 1A shows a vibration damper 1 in cross section, wherein for purposes of simplification, the work piston and the piston rod are not shown. The work cylinder 2 is surrounded by a jacket tube 12, on the outer circumferential surface of which there is an electrically controllable damping valve 3. The electrically controllable damping valve 3 comprises in particular the coil 4, the armature 5, the valve body 6, the armature guide 15 and a valve seat 7. Preferably the valve seat 7 is formed on the armature guide 15 at the lower end of the armature guide 15. Preferably there is a flow passage 8 through the valve seat 7. Preferably the valve body 6 is movable such that the valve body 6 may be moved away from the valve seat 7, thereby opening the flow passage 8, and the valve body 6 may be moved to contact the valve seat 7, thereby closing the flow passage 8. Preferably the damping valve 3 further comprises a means, such as the outer plug 13b, for limiting the distance that the armature 5 can move in a direction away from the valve seat 7. Preferably the limiting means limits the distance that the armature 5 can move by not moving when the armature 5 moves into contact with the limiting means. Limiting the distance that the armature 5 can move preferably limits the distance that the valve body 6 can move and therefore limits the valve stroke.

The armature 5 is equipped with an adjusting screw 9, which adjusting screw 9 is threadedly engaged in the armature 5. Preferably the spring 10 biases the armature 5 toward the valve body 6, thereby causing the armature 5 and the valve body 6 to remain in contact with one another and to move as a unit. Preferably the valve body 6 and the armature 5 may be moved such that the valve body 6 contacts the valve seat 7 and the adjusting screw 9 contacts the valve body 6. Preferably an adjustment of the adjusting screw 9 may be made while the armature 5, valve body 6 and adjusting screw 9 are so positioned. The adjusting screw 9 may have a hexagonal socket into which a suitable tool may be inserted to adjust the adjusting screw 9. Preferably, adjusting the adjusting screw 9 adjusts the distance between the valve body 6 and the armature 5. Preferably the adjusting screw 9 is adjusted such that an appropriate distance X is set between the valve seat 7 and the upper end surface of the armature 5, thereby correctly adjusting the valve stroke. Possibly the adjustment of the adjusting screw 9 may be made before either the outer plug 13b or the inner plug 13a is installed. Suitable tools might be used through holes in the armature 5 and the stop plate 11 to adjust the adjusting screw 9. Possibly the adjustment of the adjusting screw 9 may be made after the outer plug 13b is installed, but before the inner plug 13a is installed in an axial hole in the outer plug 13b. Such a possible adjustment might require suitable tools that may be used through the hole in the outer plug 13b as well as through the holes in the armature 5 and the stop plate 11.

FIG. 1a illustrates two distances X1 and X2, which may, respectively be termed a "first distance" and a "second distance". Distance X1 essentially represents the distance that the armature 5 and valve body 6 can move together, thus representing the valve stroke. Distance X2 essentially represents the relative distance between armature 5 and valve body 6, which relative distance is adjustable and essentially governs the valve stroke, or distance X1.

Preferably the inner plug 13a comprises a pin 14 and the pin 14 may engage the stop plate 11. Preferably the spring 10 is compressed between the stop plate 11 and the inside lower surface of the armature 5, thereby biasing the armature 5 toward the valve body 6. Preferably by adjusting the axial position of the inner plug 13a, and therefore the axial position of the pin 14, the axial position of the stop plate may be adjusted, thereby adjusting the prestress in the spring 10 and, via the armature 5 and the adjusting screw 9, the biasing force on the valve body 6. Preferably, there is a cavity 10a within armature 5, wherein the cavity 10a essentially extends from a front portion of armature 5 to the vicinity of stop plate 11.

FIG. 2 shows an embodiment in which the adjusting screw 9a is preferably rigidly attached to the valve body 6. Preferably the distance X between the valve seat 7 and the upper end surface of the armature 5, and therefore the adjustment of the valve stroke, may be set in the embodiment shown in FIG. 2 in the manner discussed above for the embodiment shown in FIG. 1A. FIG. 2 also illustrates distances X1 and X2, as described above in relation to FIG. 1A.

FIG. 3 shows an additional embodiment having a different adjusting device for adjusting the valve stroke. Preferably the position to which the armature 5 can move furthest away from the valve seat is fixed with respect to the armature guide 15. It may be that in the embodiment shown in FIG. 3, the valve seat may be moved axially relative to the rest of the armature guide 15, thereby allowing the valve stroke to be adjusted without adjusting the axial distance between the valve body 6 and the armature 5. Preferably the valve seat is on the upper end surface of a hollow-core screw 16 rather than being formed as a constriction on the inner cylindrical surface of the armature guide 15. The hollow-core screw 16 preferably can be axially adjusted in relation to the armature guide 15, thereby adjusting the position of the upper end surface of the armature 5 when the valve body 6 is in contact with the valve seat.

FIG. 3 also illustrates distance X1, similarly to FIGS. 1A and 2. Additionally, FIG. 3 illustrates a distance X3, which may be termed a "third distance". Distance X3 essentially represents the distance between hollow core screw 16 and stop plate 11.

Other embodiments may have both an adjusting device which moves a valve seat with respect to an armature guide which is fixed relative to the furthest position of the armature from the valve seat, such as the adjusting device shown in FIG. 3, and an adjusting device which adjusts the distance between a valve body and an armature, such as the adjusting devices shown in FIG. 1A and in FIG. 2.

One feature of the invention resides broadly in the hydraulic adjustable vibration damper with a piston fastened to a piston rod and dividing a work cylinder into two work chambers filled with damping fluid, whereby at least partly to control the damping force, an electromagnetically activated damping valve comprising a coil, a magnetic armature, a valve body and a valve seat pressurizes a flow passage, characterized by the fact that there is an adjusting device for the valve body 6.

Another feature of the invention resides broadly in the vibration damper, characterized by the fact that the connection between the armature 5 and the valve body 6 can be axially adjusted, to serve as the adjustment device.

Yet another feature of the invention resides broadly in the vibration damper, characterized by the fact that an adjusting screw or set screw 9 is the connection.

Still another feature of the invention resides broadly in the vibration damper, characterized by the fact that the adjusting screw 9 is located inside the armature 5, against which the valve body 6 is braced.

Another feature of the invention resides broadly in the vibration damper, characterized by the fact that the valve body 6 is equipped on the side facing the armature 5 with a threaded part 9a, which is engaged in a corresponding region of the armature 5.

Yet another feature of the invention resides broadly in the vibration damper, characterized by the fact that the connection is accessible from outside by means of recesses and can be adjusted.

Still another feature of the invention resides broadly in the vibration damper, characterized by the fact that inside the armature 5 there is a spring 10, which can be prestressed by means of an axially adjustable stop plate 11.

Another feature of the invention resides broadly in the vibration damper, characterized by the fact that the stop plate 11 is accessible from outside.

Still another feature of the invention resides broadly in the vibration damper according, characterized by the fact that the connection is accessible from outside through the stop plate 11.

Yet another feature of the invention resides broadly in the vibration damper, characterized by the fact that the adjusting device is an axially adjustable hollow-core screw banjo bolt, the end surface of which forms the valve seat.

All, or substantially all, of the components and methods of the various embodiments may be used in any combination with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shaps in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper for motor vehicles, said damper comprising a cylinder assembly having an arrangement for varying damping of a piston assembly disposed therein, said piston assembly dividing said cylinder into at least two chambers, each for containing damping fluid, said vibration damper comprising:

means for throttling said damping fluid when said damping fluid moves from one of said chambers into another;

said piston assembly having a piston rod and piston;

said piston rod having first means for attachment of said piston rod at one end thereof;

said cylinder assembly having second means for attachment at a portion thereon other than said first means for attachment at said piston rod;

means for bypassing damping fluid between said at least two chambers;

means for accepting bypassed damping fluid;

said bypassing means being disposed to bypass said damping fluid from at least one of said damping fluid-containing chambers to said accepting means;

said bypassing means including valve means for regulating flow of said damping fluid in said bypassing means; and said valve means comprising:

a valve seat and a displaceable component for opening and closing against said valve seat and for regulating flow of said damping fluid in said bypassing means;

said displaceable component being displaceable between a closed position and an open position, said displaceable component being disposed against said valve seat in said closed position, said displaceable component being disposed away from said valve seat in said open position, and said displaceable component being configured for being displaceable a first distance between said closed position and said open position;

means for adjusting said first distance between said closed position and said open position;

said valve means further comprising stop means for being disposed against said displaceable component in said open position;

said displaceable component comprising a first portion and a second portion, said first portion being disposed against said valve seat in said closed position, and said second portion being disposed against said stop means in said open position;

said displaceable component being configured to have a second distance between said first portion of said displaceable component and said second portion of said displaceable component;

said means for adjusting said first distance between said closed position and said open position comprising means for adjusting said second distance between said first portion of said displaceable component and said second portion of said displaceable component;

said means for adjusting said second distance between said first portion of said displaceable component and said second portion of said displaceable component comprising a set screw; and said set screw threadedly engaging said second portion of said displaceable component.

2. The vibration damper for motor vehicles, according to claim 1, wherein said second portion of said displaceable component has a first end and a second end;

said set screw threadedly engages said first end of said second portion of said displaceable component;

said second portion of said displaceable component has a cavity, said cavity extending from said second end of said second portion of said displaceable component to said set screw;

said valve means has an outer surface; and said valve means has a access hole extending from said outer surface of said valve means to said cavity of said second portion of said displaceable component, said access hole for enabling adjustment of said set screw from outside said valve means through said access hole and said cavity of said second portion of said displaceable component.

3. The vibration damper for motor vehicles, according to claim 2, wherein:

said valve means further comprises a stop plate and a spring, said stop plate and said spring being disposed within said cavity of said second portion of said displaceable component, said spring being disposed between said stop plate and said first end of said second portion of said displaceable component, and said spring biasing said first end of said second portion of said displaceable component away from said stop plate;

said stop plate has a hole, said hole being aligned with said access hole of said valve means, said hole in said stop plate for enabling adjustment of aid set screw from outside said valve means through said hole in said stop plate, said access hole of said valve means and said cavity of said second portion of said displaceable component;

said valve means further comprises a plug disposed in said access hole of said valve means;

said spring provides a bias between said first end of said second portion of said displaceable component and said stop plate; and said plug comprises means for adjusting said bias between said first end of said second portion of said displaceable component and said stop plate.

4. The vibration damper for motor vehicles, according to claim 3, wherein said valve means comprises electromagnetically activated valve means;

said electromagnetically activated valve means comprises an electromagnetic coil; and said second portion of said displaceable component comprises a magnetic armature.

5. The vibration damper for motor vehicles, according to claim 4, wherein:

said set screw is rigidly attached to said first portion of said displaceable component;

said set screw has a first end and a second end, the first end of said set screw facing away from said stop plate and the second end of said set screw facing towards said stop plate;

said set screw comprises a socket portion at the second end thereof, said socket portion comprising a recess in the second end of the set screw;

said recess of said set screw is aligned with said access hole of said valve means, said hole of said stop plate, and said cavity of said second portion of said displaceable component;

said recess of said set screw is configured to enable adjustment of said set screw from outside said valve means through said hole in said stop plate, said access hole of said valve means and said cavity of said second portion of said displaceable component;

said recess has a generally hexagonal cross-sectional shape and is configured to accommodate therewithin a hexagonal wrench from outside said valve means, through said hole in said stop plate, said access hole of said valve means and said cavity of said second portion of said displaceable component;

said spring is disposed coaxially with respect to said hole in said stop plate, said access hole of said valve means and said cavity of said second portion of said displaceable component;

said means for adjusting bias between said first end of said second portion of said displaceable component and said stop plate comprises a pin;

said pin is disposed to extend between said access hole of said valve means to said stop plate and is adjustable in an axial direction, along with said plug, to adjust the bias between said first end of said second portion of said displaceable component and said stop plate;

said pin and said plug are removable from said access hole to provide an open passage from outside said valve means to said recess of said set screw, through said access hole, said hole in said stop plate, and said cavity of said second portion of said displaceable component;

said stop plate comprises a disc portion and a raised portion extending from said disc portion;

said disc portion of said stop plate is disposed to extend substantially across the entire said cavity of said second portion of said displaceable component;

said valve means comprises a greater plug for being disposed towards an outer portion of said valve means;

said access hole is disposed through said greater plug;

said displaceable component is disposed against said greater plug when said displaceable component is in said open position;

said displaceable component defines therewithin an upper chamber, said upper chamber being defined between said greater plug and said stop plate;

said upper chamber of said displacement component has a diameter greater than that of said pin;

said disc portion of said stop plate comprises a plurality of openings to provide fluid communication between said cavity of said second portion of said displacement component and said upper chamber of said displaceable component;

said raised portion of said stop plate is generally cylindrical and extends from said disc portion toward said set screw;

said spring is configured to be backed by said disc portion of said stop plate and provide said biasing force between said disc portion of said stop plate and said first end of said second portion of said displaceable component;

said hole of said stop plate is disposed within said raised portion of said stop plate;

said spring is disposed to surround said raised portion of said stop plate;

said disc portion of said stop plate has a back portion facing said upper chamber of said displaceable component;

said stop plate further comprises an annular shoulder portion disposed on said back portion;

said annular shoulder portion is disposed coaxially with respect to said hole of said stop plate and immediately adjacent thereto and has an inner diameter slightly smaller than that of said hole of said stop plate;

said pin has an indented annular portion disposed thereabout;

said indented annular portion of said pin is configured to engage with said annular shoulder portion of said stop plate to interlock said pin with said stop plate;

said first portion of said displaceable component comprising a main annular portion and a head portion;

said head portion is for being biased against said valve seat;

said main annular portion comprises a threaded hole being disposed therethrough;

said set screw extends from said head portion in a direction away from said valve seat;

said set screw is configured for threadedly engaging said threaded hole portion of said main annular portion.

6. The vibration damper for motor vehicles, according to claim 4, wherein:

said spring biases said set screw against said first portion of said displaceable component;

said set screw has a first end and a second end, the first end of said set screw facing away from said stop plate and the second end of said set screw facing towards said stop plate;

said set screw comprises a socket portion at the second end thereof, said socket portion comprising a recess in the second end of the set screw;

said recess of said set screw is aligned with said access hole of said valve means, said hole of said stop plate, and said cavity of said second portion of said displaceable component;

said recess of said set screw is configured to enable adjustment of said set screw from outside said valve means through said hole in said stop plate, said access hole of said valve means and said cavity of said second portion of said displaceable component;

said recess has a generally hexagonal cross-sectional shape and is configured to accommodate therewithin a hexagonal wrench from outside said valve means, through said hole in said stop plate, said access hole of said valve means and said cavity of said second portion of said displaceable component;

said spring is disposed coaxially with respect to said hole in said stop plate, said access hole of said valve means and said cavity of said second portion of said displaceable component;

said means for adjusting bias between said first end of said second portion of said displaceable component and said stop plate comprises a pin;

said pin is disposed to extend between said access hole of said valve means to said stop plate and is adjustable in an axial direction, along with said plug, to adjust the bias between said first end of said second portion of said displaceable component and said stop plate;

said pin and said plug are removable from said access hole to provide an open passage from outside said valve means to said recess of said set screw, through said access hole, said hole in said stop plate, and said cavity of said second portion of said displaceable component;

said stop plate comprises a disc portion and a raised portion extending from said disc portion;

said disc portion of said stop plate is disposed to extend substantially across the entire said cavity of said second portion of said displaceable component;

said valve means comprises a greater plug for being disposed towards an outer portion of said valve means;

said access hole is disposed through said greater plug;

said displaceable component is disposed against said greater plug when said displaceable component is in said open position;

said displaceable component defines therewithin an upper chamber, said upper chamber being defined between said greater plug and said stop plate;

said upper chamber of said displaceable component has a diameter greater than that of said pin;

said disc portion of said stop plate comprises a plurality of openings to provide fluid communication between said cavity of said second portion of said displaceable component and said upper chamber of said displaceable component;

said raised portion of said stop plate is generally cylindrical and extends from said disc portion toward said set screw;

said spring is configured to be backed by said disc portion of said stop plate and provide said biasing force between said disc portion of said stop plate and said first end of said second portion of said displaceable component;

said hole of said stop plate is disposed within said raised portion of said stop plate;

said spring is disposed to surround said raised portion of said stop plate;

said disc portion of said stop plate has a back portion facing said upper chamber of said displaceable component;

said stop plate further comprises an annular shoulder portion disposed on said back portion;

said annular shoulder portion is disposed coaxially with respect to said hole of said stop plate and immediately adjacent thereto and has an inner diameter slightly smaller than that of said hole of said stop plate;

said pin has an indented annular portion disposed thereabout;

said indented annular portion of said pin is configured to engage with said annular shoulder portion of said stop plate to interlock said pin with said stop plate;

said first portion of said displaceable component comprises an outer cylindrical portion and an inner cylindrical portion;

said inner cylindrical portion is disposed within, and is coaxial with, said outer cylindrical portion;

said inner cylindrical portion is slightly raised with respect to said outer cylindrical portion, in a direction towards said set screw;

said set screw is configured to interface with said inner cylindrical portion and to be biased against said inner cylindrical portion;

each of said set screw and said inner cylindrical portion has a diameter; and the diameter of said set screw is approximately equal to the diameter of said inner cylindrical portion.

7. A vibration damper for motor vehicles, said damper comprising a cylinder assembly having an arrangement for varying damping of a piston assembly disposed therein, said piston assembly dividing said cylinder into at least two chambers, each for containing damping fluid, said vibration damper comprising:

means for throttling said damping fluid when said damping fluid moves from one of said chambers into another;

said piston assembly having a piston rod and piston;

said piston rod having first means for attachment of said piston rod at one end thereof;

said cylinder assembly having second means for attachment at a portion thereon other than said first means for attachment at said piston rod;

means for bypassing damping fluid between said at least two chambers;

means for accepting bypassed damping fluid;

said bypassing means being disposed to bypass said damping fluid from at least one of said damping fluid-containing chambers to said accepting means;

said bypassing means including valve means for regulating flow of said damping fluid in said bypassing means; and said valve means comprising:

a valve seat and a displaceable component for opening and closing against said valve seat and for regulating flow of said damping fluid in said bypassing means;

said displaceable component being displaceable between a closed position and an open position, said displaceable component being disposed against said valve seat in said closed position, said displaceable component being disposed away from said valve seat in said open position, and said displaceable component being configured for being displaceable a first distance between said closed position and said open position;

means for adjusting said first distance between said closed position and said open position;

said valve means further comprising stop means for being disposed against said displaceable component in said open position;

said displaceable component comprising a first portion and a second portion, said first portion being disposed against said valve seat in said closed position, and said second portion being disposed against said stop means in said open position;

said valve means being configured to have a third distance between said valve seat and said stop means;

said means for adjusting said first distance between said closed position and said open position compress means for adjusting said third distance between said valve seat and said stop means;

said means for adjusting said third distance between said valve seat and said stop means comprising an adjustable hollow-core screw, said adjustable hollow-core screw having an end surface, and said end surface comprising said valve seat.

8. The vibration damper for motor vehicles, according to claim 7, wherein said displaceable component is configured to have a second distance between said first portion of said displaceable component and said second portion of said displaceable component; and said means for adjusting said first distance between said closed position and said open position further comprises means for adjusting said second distance between said first portion of said displaceable component and said second portion of said displaceable component.

9. The vibration damper for motor vehicles, according to claim 8, wherein said means for adjusting said second distance between said first portion of said displaceable component and said second portion of said displaceable component comprises a set screw; and said set screw threadedly engages said second portion of said displaceable component.

10. The vibration damper for motor vehicles, according to claim 9, wherein said second portion of said displaceable component has a first end and a second end;

said set screw threadedly engages said first end of said second portion of said displaceable component;

said second portion of said displaceable component has a cavity, said cavity extending from said second end of said second portion of said displaceable component to said set screw;

said valve means has an outer surface; and said valve means has a access hole extending from said outer surface of said valve means to said cavity of said second portion of said displaceable component, said access hole for enabling adjustment of said set screw from outside said valve means through said access hole and said cavity of said second portion of said displaceable component.

11. The vibration damper for motor vehicles, according to claim 10, wherein:

said valve means further comprises a stop plate and a spring, said stop plate and said spring being disposed within said cavity of said second portion of said displaceable component, said spring being disposed between said stop plate and said first end of said second portion of said displaceable component, and said spring biasing said first end of said second portion of said displaceable component away from said stop plate;

said stop plate has a hole, said hole being aligned with said access hole of said valve means, said hole in said stop plate for enabling adjustment of said set screw from outside said valve means through said hole in said stop plate, said access hole of said valve means and said cavity of said second portion of said displaceable component;

said valve means further comprises a plug disposed in said access hole of said valve means;

said spring provides a bias between said first end of said second portion of said displaceable component and said stop plate; and said plug comprises means for adjusting said bias between said first end of said second portion of said displaceable component and said stop plate.

12. The vibration damper for motor vehicles, according to claim 11, wherein:

said electromagnetically activated valve means comprises an electromagnetic coil; and said second portion of said displaceable component comprises a magnetic armature.

13. The vibration damper for motor vehicles, according to claim 12, wherein:

said set screw is rigidly attached to said first portion of said displaceable component;

said set screw has a first end and a second end, the first end of said set screw facing away from said stop plate and the second end of said set screw facing towards said stop plate;

said set screw comprises a socket portion at the second end thereof, said socket portion comprising a recess in the second end of the set screw;

said recess of said set screw is aligned with said access hole of said valve means, said hole of said stop plate, and said cavity of said second portion of said displaceable component;

said recess of said set screw is configured to enable adjustment of said set screw from outside said valve means through said hole in said stop plate, said access hole of said valve means and said cavity of said second portion of said displaceable component;

said recess has a generally hexagonal cross-sectional shape and is configured to accommodate therewithin a hexagonal wrench from outside said valve means, through said hole in said stop plate, said access hole of said valve means and said cavity of said second portion of said displaceable component;

said spring is disposed coaxially with respect to said hole in said stop plate, said access hole of said valve means and said cavity of said second portion of said displaceable component;

said means for adjusting bias between said first end of said second portion of said displaceable component and said stop plate comprises a pin;

said pin is disposed to extend between said access hole of said valve means to said stop plate and is adjustable in an axial direction, along with said plug, to adjust the bias between said first end of said second portion of said displaceable component and said stop plate;

said pin and said plug are removable from said access hole to provide an open passage from outside said valve means to said recess of said set screw, through said access hole, said hole in said stop plate, and said cavity of said second portion of said displaceable component;

said stop plate comprises a disc portion and a raised portion extending from said disc portion;

said disc portion of said stop plate is disposed to extend substantially across the entire said cavity of said second portion of said displaceable component;

said valve means comprises a greater plug for being disposed towards an outer portion of said valve means;

said access hole is disposed through said greater plug;

said displaceable component is disposed against said greater plug when said displaceable component is in said open position;

said displaceable component defines therewithin an upper chamber, said upper chamber being defined between said greater plug and said stop plate;

said upper chamber of said displaceable component has a diameter greater than that of said pin;

said disc portion of said stop plate comprises a plurality of openings to provide fluid communication between said cavity of said second portion of said displaceable component and said upper chamber of said displaceable component;

said raised portion of said stop plate is generally cylindrical and extends from said disc portion toward said set screw;

said spring is configured to be backed by said disc portion of said stop plate and provide said biasing force between said disc portion of said stop plate and said first end of said second portion of said displaceable component;

said hole of said stop plate is disposed within said raised portion of said stop plate;

said spring is disposed to surround said raised portion of said stop plate;

said disc portion of said stop plate has a back portion facing said upper chamber of said displaceable component;

said stop plate further comprises an annular shoulder portion disposed on said back portion;

said annular shoulder portion is disposed coaxially with respect to said hole of said stop plate and immediately adjacent thereto and has an inner diameter slightly smaller than that of said hole of said stop plate;

said pin has an indented annular portion disposed thereabout;

said indented annular portion of said pin is configured to engage with said annular shoulder portion of said stop plate to interlock said pin with said stop plate;

said hollow-core screw comprises a hollow core portion, said hollow core portion being configured to permit the flow of said damping fluid through said valve seat;

said armature has a diameter;

said hollow-core screw has a diameter significantly less than that of said armature;

said first portion of said displaceable component comprises a main annular portion and a head portion;

said head portion is for being biased against said valve seat;

said main annular portion comprises a threaded hole being disposed therethrough;

said set screw extends from said head portion in a direction away from said valve seat; and said set screw is configured for threadedly engaging said threaded hole portion of said main annular portion.

14. The vibration damper for motor vehicles, according to claim 12, wherein:

said spring biases said set screw against said first portion of said displaceable component;

said set screw has a first end and a second end, the first end of said set screw facing away from said stop plate and the second end of said set screw facing towards said stop plate;

said set screw comprises a socket portion at the second end thereof, said socket portion comprising a recess in the second end of the set screw;

said recess of said set screw is aligned with said access hole of said valve means, said hole of said stop plate, and said cavity of said second portion of said displaceable component;

said recess of said set screw is configured to enable adjustment of said set screw from outside said valve means through said hole in said stop plate, said access hole of said valve means and said cavity of said second portion of said displaceable component;

said recess has a generally hexagonal cross-sectional shape and is configured to accommodate therewithin a hexagonal wrench from outside said valve means, through said hole in said stop plate, said access hole of said valve means and said cavity of said second portion of said displaceable component;

said spring is disposed coaxially with respect to said hole in said stop plate, said access hole of said valve means and said cavity of said second portion of said displaceable component;

said means for adjusting bias between said first end of said second portion of said displaceable component and said stop plate comprises a pin;

said pin is disposed to extend between said access hole of said valve means to said stop plate and is adjustable in an axial direction, along with said plug, to adjust the bias between said first end of said second portion of said displaceable component and said stop plate;

said pin and said plug are removable from said access hole to provide an open passage from outside said valve means to said recess of said set screw, through said access hole, said hole in said stop plate, and said cavity of said second portion of said displaceable component;

said stop plate comprises a disc portion and a raised portion extending from said disc portion;

said disc portion of said stop plate is disposed to extend substantially across the entire said cavity of said second portion of said displaceable component;

said valve means comprises a greater plug for being disposed towards an outer portion of said valve means;

said access hole is disposed through said greater plug;

said displaceable component is disposed against said greater plug when said displaceable component is in said open position;

said displaceable component defines therewithin an upper chamber, said upper chamber being defined between said greater plug and said stop plate;

said upper chamber of said displacement component has a diameter greater than that of said pin;

said disc portion of said stop plate comprises a plurality of openings to provide fluid communication between said cavity of said second portion of said displacement component and said upper chamber of said displaceable component;

said raised portion of said stop plate is generally cylindrical and extends from said disc portion toward said set screw;

said spring is configured to be backed by said disc portion of said stop plate and provide said biasing force between said disc portion of said stop plate and said first end of said second portion of said displaceable component;

said hole of said stop plate is disposed within said raised portion of said stop plate;

said spring is disposed to surround said raised portion of said stop plate;

said disc portion of said stop plate has a back portion facing said upper chamber of said displaceable component;

said stop plate further comprises an annular shoulder portion disposed on said back portion;

said annular shoulder portion is disposed coaxially with respect to said hole of said stop plate and immediately adjacent thereto and has an inner diameter slightly smaller than that of said hole of said stop plate;

said pin has an indented annular portion disposed thereabout;

said indented annular portion of said pin is configured to engage with said annular shoulder portion of said stop plate to interlock said pin with said stop plate;

said hollow-core screw comprises a hollow core portion, said hollow core portion being configured to permit the flow of said damping fluid through said valve seat;

said armature has a diameter;

said hollow-core screw has a diameter significantly less than that of said armature;

said first portion of said displaceable component comprises an outer cylindrical portion and an inner cylindrical portion;

said inner cylindrical portion is disposed within, and is coaxial with, said outer cylindrical portion;

said inner cylindrical portion is slightly raised with respect to said outer cylindrical portion, in a direction towards said set screw;

said set screw is configured to interface with said inner cylindrical portion and to be biased against said inner cylindrical portion;

each of said set screw and said inner cylindrical portion has a diameter; and the diameter of said set screw is approximately equal to the diameter of said inner cylindrical portion.

15. Method of assembling and operating a vibration damper for motor vehicles, the damper comprising a cylinder assembly having an arrangement for varying damping of a piston assembly disposed therein, the piston assembly dividing the cylinder into at least two chambers, each for containing damping fluid, said method comprising the steps of:

assembling the vibration damper by way of the following steps:

providing means for throttling the damping fluid when the damping fluid moves from one of the chambers into another;

providing the piston assembly with a piston rod and a piston;

providing the piston rod with first means for attachment of the piston rod at one end thereof;

providing the cylinder assembly with second means for attachment at a portion thereon other than the first means for attachment at the piston rod;

providing means for bypassing damping fluid between the at least two chambers;

providing means for accepting bypassed damping fluid;

disposing the bypassing means to bypass the damping fluid from at least one of the damping fluid-containing chambers to the accepting means;

providing the bypassing means with valve means for regulating flow of the damping fluid in the bypassing means;

providing the valve means with a valve seat and a displaceable component for opening and closing against the valve seat and for regulating flow of the damping fluid in the bypassing means;

configuring the displaceable component to be displaceable between a closed position and an open position, the displaceable component being disposed against the valve seat in the closed position, the displaceable component being disposed away from the valve seat in the open position, and the displaceable component being configured for being displaceable a first distance between the closed position and the open position; and providing means for adjusting the first distance between the closed position and the open position;

operating the vibration damper by way of the following steps:

throttling the damping fluid, by means of the throttling means, when the damping fluid moves from one of the chambers into another;

bypassing the damping fluid, by means of the bypassing means, between the at least two chambers;

accepting, by means of the accepting means, the bypassed damping fluid;

bypassing, by means of the bypassing means, the damping fluid from at least one of the damping fluid-containing chambers to the accepting means;

regulating, by means of the valve means, the flow of damping fluid in the bypassing means;

said step of regulating comprising the steps of:

opening and closing the displaceable component against the valve seat; and displacing the displaceable component the first distance between the closed position and the open position;

subsequent to the steps of assembling the vibration damper, adjusting the first distance between the closed position and the open position;

configuring the vibration damper such that:

the valve means further comprises stop means for being disposed against the displaceable component in the open position;

the displaceable component comprises a first portion and a second portion, the first portion being disposed against the valve seat in the closed position, and the second portion being disposed against the stop means in the open position;

the valve means is configured to have a third distance between the valve seat and the stop means;

the means for adjusting the first distance between the closed position and the open position comprises means for adjusting the third distance between the valve seat and the stop means;

the means for adjusting the third distance between the valve seat and the stop means comprises an adjustable hollow-core screw, the adjustable hollow-core screw having an end surface, and the end surface comprising the valve seat;

the displaceable component is configured to have a second distance between the first portion of the displaceable component and the second portion of the displaceable component;

the means for adjusting the first distance between the closed position and the open position further comprises means for adjusting the second distance between the first portion of the displaceable component and the second portion of the displaceable component;

the means for adjusting the second distance between the first portion of the displaceable component and the second portion of the displaceable component comprises a set screw;

the set screw threadedly engages the second portion of the displaceable component;

the second portion of the displaceable component has a first end and a second end;

the set screw threadedly engages the first end of the second portion of the displaceable component;

the second portion of the displaceable component has a cavity, the cavity extending from the second end of the second portion of the displaceable component to the set screw;

the valve means has an outer surface;

the valve means has a access hole extending from the outer surface of the valve means to the cavity of the second portion of the displaceable component, the access hole for enabling adjustment of the set screw from outside the valve means through the access hole and the cavity of the second portion of the displaceable component;

the valve means further comprises a stop plate and a spring, the stop plate and the spring being disposed within the cavity of the second portion of the displaceable component, the spring being disposed between the stop plate and the first end of the second portion of the displaceable component, and the spring biasing the first end of the second portion of the displaceable component away from the stop plate;

the stop plate has a hole, the hole being aligned with the access hole of the valve means, the hole in the stop plate for enabling adjustment of the set screw from outside the valve means through the hole in the stop plate, the access hole of the valve means and the cavity of the second portion of the displaceable component;

the valve means further comprises a plug disposed in the access hole of the valve means;

the spring provides a bias between the first end of the second portion of the displaceable component and the stop plate;

the plug comprises means for adjusting the bias between the first end of the second portion of the displaceable component and the stop plate;

the valve means comprises electromagnetically activated valve means;

the electromagnetically activated valve means comprises an electromagnetic coil;

the second portion of the displaceable component comprises a magnetic armature;

the set screw is rigidly attached to the first portion of the displaceable component;

the set screw has a first end and a second end, the first end of the set screw facing away from the stop plate and the second end of the set screw facing towards the stop plate;

the set screw comprises a socket portion at the second end thereof, the socket portion comprising a recess in the second end of the set screw;

the recess of the set screw is aligned with the access hole of the valve means, the hole of the stop plate, and the cavity of the second portion of the displaceable component;

the recess of the set screw is configured to enable adjustment of the set screw from outside the valve means through the hole in the stop plate, the access hole of the valve means and the cavity of the second portion of the displaceable component;

the recess has a generally hexagonal cross-sectional shape and is configured to accommodate therewithin a hexagonal wrench from outside the valve means, through the hole in the stop plate, the access hole of the valve means and the cavity of the second portion of the displaceable component;

the spring is disposed coaxially with respect to the hole in the stop plate, the access hole of the valve means and the cavity of the second portion of the displaceable component;

the means for adjusting bias between the first end of the second portion of the displaceable component and the stop plate comprises a pin;

the pin is disposed to extend between the access hole of the valve means to the stop plate and is adjustable in an axial direction, along with the plug, to adjust the bias between the first end of the second portion of the displaceable component and the stop plate;

the pin and the plug are removable from the access hole to provide an open passage from outside the valve means to the recess of the set screw, through the access hole, the hole in the stop plate, and the cavity of the second portion of the displaceable component;

the stop plate comprises a disc portion and a raised portion extending from the disc portion;

the disc portion of the stop plate is disposed to extend substantially across the entire the cavity of the second portion of the displaceable component;

the valve means comprises a greater plug for being disposed towards an outer portion of the valve means;

the access hole is disposed through the greater plug;

the displaceable component is disposed against the greater plug when the displaceable component is in the open position;

the displaceable component defines therewithin an upper chamber, the upper chamber being defined between the greater plug and the stop plate;

the upper chamber of the displaceable component has a diameter greater than that of the pin;

the disc portion of the stop plate comprises a plurality of openings to provide fluid communication between the cavity of the second portion of the displaceable component and the upper chamber of the displaceable component;

the raised portion of the stop plate is generally cylindrical and extends from the disc portion toward the set screw;

the spring is configured to be backed by the disc portion of the stop plate and provide the biasing force between the disc portion of the stop plate and the first end of the second portion of the displaceable component;

the hole of the stop plate is disposed within the raised portion of the stop plate;

the spring is disposed to surround the raised portion of the stop plate;

the disc portion of the stop plate has a back portion facing the upper chamber of the displaceable component;

the stop plate further comprises an annular shoulder portion disposed on the back portion;

the annular shoulder portion is disposed coaxially with respect to the hole of the stop plate and immediately adjacent thereto and has an inner diameter slightly smaller than that of the hole of the stop plate;

the pin has an indented annular portion disposed thereabout;

the indented annular portion of the pin is configured to engage with the annular shoulder portion of the stop plate to interlock the pin with the stop plate;

the hollow-core screw comprises a hollow core portion, the hollow core portion being configured to permit the flow of the damping fluid through the valve seat;

the armature has a diameter;

the hollow-core screw has a diameter significantly less than that of the armature;

the first portion of the displaceable component comprises a main annular portion and a head portion;

the head portion is for being biased against the valve seat;

the main annular portion comprises a threaded hole being disposed therethrough;

the set screw extends from the head portion in a direction away from the valve seat; and the set screw is configured for threadedly engaging the threaded hole portion of the main annular portion;

adjusting the third distance between the valve seat and the stop means;

said step of adjusting the first distance between the closed position and the open position comprising the step of adjusting the set screw from outside the valve means through the hole in the stop plate, the access hole of the valve means, and the cavity of the second portion of the displaceable component;

said step of adjusting the set screw from outside the valve means comprising the step of accommodating a hexagonal wrench in the recess of the set screw, from outside the valve means, through the hole in the stop plate, the access hole of the valve means, and the cavity of the second portion of the displaceable component;

adjusting the bias between the first end of the second portion of the displaceable component and the stop plate; and said step of adjusting the bias between the first end of the second portion of the displaceable component and the stop plate comprising the step of adjusting the pin, along with the plug, in an axial direction.

* * * * *

UNITED STATES PATENT AND TRADEMARK OFFICE
CERTIFICATE OF CORRECTION

PATENT NO. : 5,301,776
DATED : April 12, 1994
INVENTOR(S) : Hubert BECK

It is certified that error appears in the above-indentified patent and that said Letters Patent is hereby corrected as shown below:

In column 3, line 47, after 'individual' delete "part" and insert --parts--.

In column 8, line 36, Claim 8, after 'of' delete "aid" and insert --said--.

In column 12, lines 61-62, Claim 7, after the second occurrence of 'position' delete "compress" and insert --comprises--.

In column 16, line 45, Claim 14, after the second occurrence of 'said' delete "displacement" and insert --displaceable--.

In column 16, line 50, Claim 14, delete "displacement" and insert --displaceable--.

Signed and Sealed this

Sixth Day of August, 1996

Attest:

BRUCE LEHMAN

Attesting Officer

Commissioner of Patents and Trademarks